S. R. SCHOLES, L. W. NICOLS AND W. F. KAUFMAN.
METHOD OF AND APPARATUS FOR REMOVING STRIAE FROM MELTED GLASS.
APPLICATION FILED OCT. 8, 1919.

1,370,673.

Patented Mar. 8, 1921.

Inventors
Samuel R. Scholes,
Lowell W. Nicols, and
Walter F. Kaufman,
By J. G. Witherspoon
Attorney S. R. SCHOLES, L. W. NICOLS AND W. F. KAUFMAN.
METHOD OF AND APPARATUS FOR REMOVING STRIAE FROM MELTED GLASS.
APPLICATION FILED OCT. 8, 1919.
1,370,673.
Patented Mar. 8, 1921.
2 SHEETS—SHEET 2.
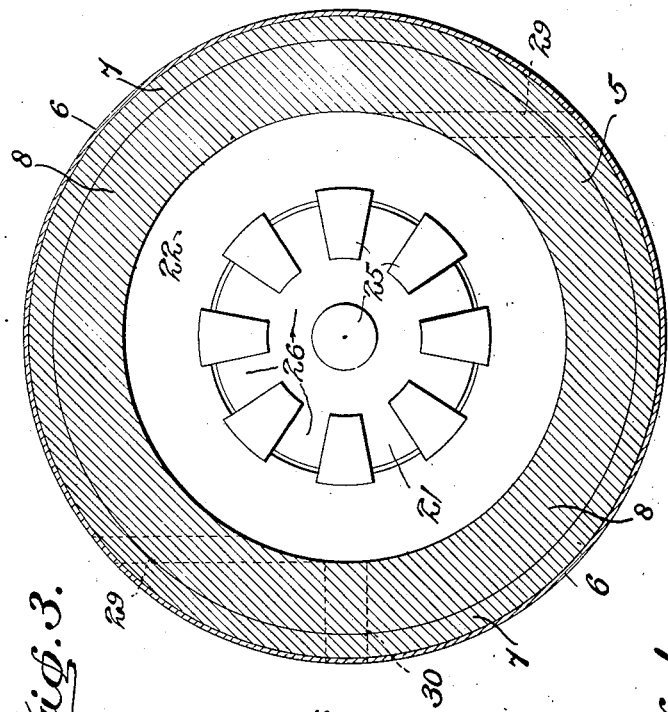
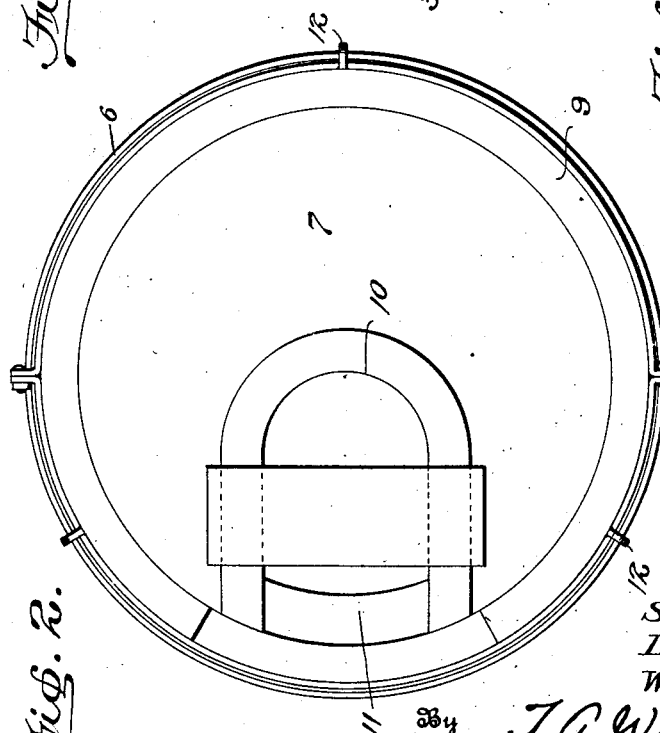
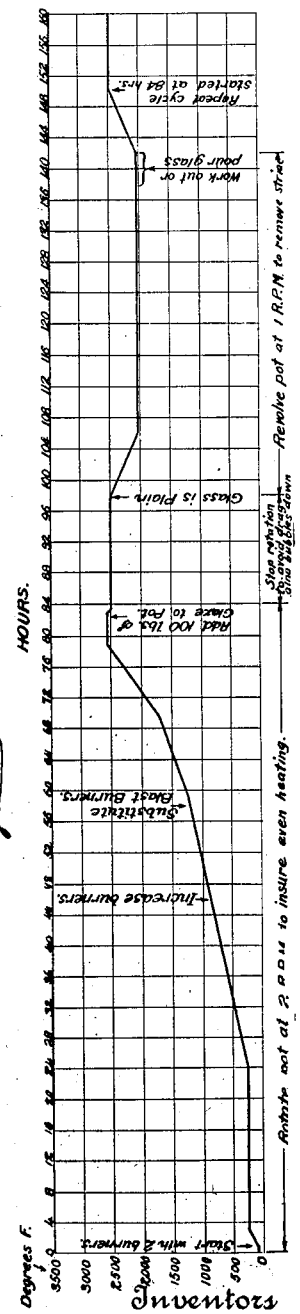
Inventors
Samuel R. Scholes,
Lowell W. Nicols, and
Walter F. Kaufman,
By T. A. Witherspoon
Attorney

UNITED STATES PATENT OFFICE.

SAMUEL R. SCHOLES, OF BEAVER, LOWELL W. NICOLS AND WALTER F. KAUFMAN, OF SEWICKLEY, PENNSYLVANIA.

METHOD OF AND APPARATUS FOR REMOVING STRIÆ FROM MELTED GLASS.

1,370,673.  Specification of Letters Patent.  Patented Mar. 8, 1921.

Application filed October 8, 1919. Serial No. 329,402.

*To all whom it may concern:*

Be it known that we, SAMUEL R. SCHOLES, LOWELL W. NICOLS, and WALTER F. KAUFMAN, respectively residing at Beaver, in the county of Beaver, State of Pennsylvania, Sewickley, county of Allegheny, State of Pennsylvania, and Sewickley, county of Allegheny, State of Pennsylvania, have invented certain new and useful Improvements in Methods of and Apparatus for Removing Striæ from Melted Glass; and we do hereby declare the following to be a full, clear, and exact description of the invention, such as will enable others skilled in the art to which it appertains to make and use the same.

This invention relates to a method of removing striæ from melted glass after which it may be gathered or worked out by hand or by semi-automatic or automatic machines or poured out and rolled or cast in any manner whatever.

In order that the invention may be better understood, it is said:—It is well known that one of the greatest sources of trouble in the making of articles of fine quality from glass is the presence of certain ropy or stringy imperfections known as cords or striæ. These striæ have a slightly different chemical composition from that of the glass immediately surrounding them and as a result have different optical properties, such as different indices of refraction, different rates of dispersion, and different percentages of absorption which combine to make the striæ visible, since the resulting glass is not a homogeneous medium for the passage of rays of light. When the striæ are parallel they are scarcely noticeable to the naked eye as in looking through a piece of plate glass, but present a cloud, or forest like appearance, when viewed from the edge of the piece. In pieces of varying thickness which are to transmit light from various angles, these striæ are very undesirable. For the production of precision lenses and mirrors, they are fatal, even though the unaided eye detects them with difficulty, or not at all. All glass would be better if it contained no striæ, and all commercial grades of glass would be vastly improved if they contained so few or such fine striæ, that they would be invisible to the unaided eye when viewed from any direction. Striæ are undoubtedly caused by an imperfect mixing of the glass, which prevents it from having a homogeneous, or a uniform chemical composition, and consequently uniform optical properties throughout. If any glass could be homogeneously or perfectly mixed after melting it would be free from striæ. The fundamental problem to be dealt with, in order to avoid these objections, is therefore, very clear, but the physical conditions under which it must be handled render the solution difficult of attainment.

The first of these conditions resides in the fact that the melting, planing and working of the glass must be carried out at such high temperatures, that the use of metal in the melting chamber or near it, is out of the question. Refractory materials are all that are left for the use of the furnace builder. The matter of a suitable container for the glass itself is furthermore of vital importance, from another standpoint.

Almost any pot material is soluble to some extent in any glass. The relative solubility of the pot in the particular glass it is to contain has an important bearing on the presence of striæ, for it introduces impurities. It can therefore be seen that as the pot wall gradually dissolves in the glass, the introduction of these new constituents changes, locally, its chemical composition and alters its optical properties, so that striæ result.

Therefore, the usual method of making optical glass is to choose a pot which will present the greatest resistance to the dissolving action of the glass in every stage of its melting, and one that is sufficiently strong at the desired temperature to hold its shape without a crack, rupture, bend or belly, and which will have a sufficiently low thermal expansion to withstand the sudden and terrific changes of temperature occasioned by filling the hot pot with a cold glass batch. Then when the glass is melted and freed from bubbles, a suitably manipulated and constructed stirrer usually of the same material as the pot, stirs the contents until it contains a small irregular mass of perfect glass near the center. In a good melt of corrosive glass the yield of this perfect glass, which is known as "A" grade, varies from 12% to 20% and it is surrounded by less perfect, and even very bad glass of every conceivable grade. One of the most potent factors in keeping this percentage so low is the constant dissolution of the stirrer itself as it passes back and forth through the glass leaving a trail of striæ in its wake. Another factor is, that in order to make this stirring attain its maximum effectiveness, the glass must be kept as fluid as possible by the maintenance of a high temperature, which same high temperature increases the solubility of both pot and stirrer. And still another factor is, that the moving stirrer does not have much effect upon the glass close to the pot walls. With a less corrosive glass, the yield has been increased beyond 20% at times by the stirrer method.

But at best, the results are uncertain. Even after exercising every conceivable precaution regarding the purity of the materials, and the course of procedure, the result is in doubt.

The only attempt to vary this method which has come to our attention, (except the substitution of the regular operations of plate glass making in which case a stirred potful was poured on the casting table,) was tried at the Pittsburgh Branch of the U. S. Bureau of Standards during the fall of 1918. This consisted in gathering the glass on a glass-worker's punty in three ways:—(a) From the front of the furnace after the stirring operation was completed and the stirrer withdrawn. (b) From the front of the furnace while the stirring operation was continued and through the same opening that the stirring was accomplished. (c) From the front of the furnace while the stirring operation continued through an opening in the back wall of the furnace.

It is evident that if enough melted glass removed from the pot by means of a punty, is at once dropped into a mold, sheared off and pressed into shape, a very great saving of time and manufacturing expense is afforded. But, it is also evident that if any considerable number of perfect objects are to be obtained in this manner, there must be a pot of uniformly good glass to work from, or a mass of uniformly good glass on the top large enough to gather from with ease; and it must be kept as uniformly good glass by a continual stirring in such a manner that any striæ drawn into the gathering area by the punty will be broken up and dissipated by the action of the stirrer before it gets on the punty.

In practice it is found with this method of using a stirrer, it is almost impossible to obtain a pot of uniformly good glass, and also very difficult to obtain a stirring action that will function with sufficient speed to break up the striæ drawn into the gathering area before it is gathered. There is also the added disadvantage in cases (b) and (c), above mentioned, of its being necessary for the gathering boy to continually endeavor to avoid losing his gather by touching the moving stirrer with the end of his punty. Then again, the stirrer works best in glass that is too hot to gather, so that in order to function with its maximum efficiency, the glass must be so fluid that it drops from the punty and therefore cannot be removed from the furnace.

Accordingly, it will now be apparent that if the dissolving of the stirrer and pot could be done away with, and a homogeneous mixing of the glass constituents still accomplished, the quality of the product would be very greatly improved. To make this point clearer, it is further said that during the melting and working period glass is a viscous liquid, or a combination of a number of partially intermingled viscous liquids. And that the mixing of these liquids may be said to resemble the pouring of a quantity of glycerin into water. The appearance of the partially mixed liquids is almost identical with that of striated glass. If we introduce a stirring rod into such a glycerin-water mixture, and stir it for a few moments, the inequalities become less and less apparent and then suddenly disappear, leaving a clear liquid with uniform optical properties, which consequently presents a homogeneous medium for the passage of rays of light. In this example, however, we deal with mobile fluids at ordinary temperatures, which do not act as solvents of their container, or of the stirring rod. The complete elimination of striæ can in this case be quickly and easily accomplished.

Our method, as will appear below, eliminates the stirrer together with its inherent difficulties just mentioned, by substituting a mixing action, induced by moving the entire pot together with its contents. There are at least four ways of accomplishing this, but we prefer the one illustrated in the drawings.

That is to say:—(a) We may provide a furnace having a bottom moving with an eccentric motion, and cause said bottom to carry the pot and its contents with it to effect a mixing action by the comparatively rapid completion of the cycle of eccentric movements. (b) We may effect the mixing of the batch constituents by a sufficiently rapid revolution of the pot and its contents about a vertical axis in one direction, and then suddenly reversing the motion. (c) We may impart a rocking motion to the container, so as to subject the contents to said motion as well as to the action of gravity as the motion changes its direction.

(d) But we prefer, as stated above, to rotate the pot and its contents around an axis inclined to the vertical as illustrated in the drawings, for the motion derived from such an apparatus not only revolves the contents around said axis but it causes a forward and backward flow under the action of gravity, of the contents in a direction transverse to the direction of rotation, and thus effects a very efficient mixing action, all as will appear below.

Referring to the accompanying drawings forming a part of this specification in which like numerals designate like parts in all the views:—

Figure 1 is a vertical sectional view of an apparatus suitable for carrying out our invention;

Fig. 2 is a top plan view on a reduced scale of the parts shown in Fig. 1;

Fig. 3 is a sectional view on the line 3—3 of Fig. 1; and

Fig. 4 is a curve showing the temperatures and times employed in operating the furnace.

1 indicates any suitable foundation, 2 a surface suitably inclined to the horizontal plane 3 at an angle of say about 22½ degrees, more or less, according to the results desired. 4 represents any suitable support or foundation resting on the inclined surface 2, upon which is located the outer wall 5 of the furnace proper.

Said wall is preferably composed of outer steel plating 6 lined with heat insulating brick 7, and inside the brick we place any suitable refractory material 8 as shown which also extends around the removable top 9 and constitutes the material out of which the flue 10 is made. Said top 9 is provided with a suitable charging hole 11. The top may be readily removed by means of lifting hooks 12.

Resting on the inclined surface 2 between the supports 4 is the bottom plate 13 of the turn table 14, whose upper plate 15 rests on the ball bearings 16, and is provided with the worm teeth 17 meshing with the worm 18 supported by the means 19 and driven by a motor not shown. Resting on the turn table 14 are the refractory supports 20, and resting on said supports 20 is the refractory block or mass 21. The refractory bottom 22 of the furnace is cut away as shown to admit the upper portion of the block 21, and the joint 23 between said block and bottom is a broken one and very open and loose as illustrated. On the upper surface of the block 21 rests a plurality of smaller supporting members 25 spaced apart to form the fire spaces 26, and over these spaces 26 and on these supports 25, rests the porcelain glass holding pot 27 as shown, containing a batch 28 of molten glass to be mixed as will be more fully described below.

Any suitable burners 29 are provided and a drain 30 is also provided as indicated. The pot 27 is made of a relatively shallow type as indicated, so that the top layers of glass will receive a considerable to and fro motion.

In operation, the freshly made or "green" pot 27 is lifted into position by a suitable crane, and the supports or bricks 25 are so disposed that the bottom of the pot will be heated to the same temperature, and its temperature increased at the same rate as its other parts, so as to prevent cracking and to produce the same degree of hardness throughout. After the pot 27 has been thus brought up to a low red heat by any suitable means, a blast may be turned on, and after the pot has been properly burned, it is filled with a batch of glass making material in the usual manner.

The heat treatment of the pot and glass material therein is important and will be understood from the curve in Fig. 4. That is to say, it is desirable to gradually bring the pot up to say about 1250° F. during a period of say about 58 hours while slowly rotating the pot at about 2 revolutions per minute, whereupon the blast burners are turned on and in the next 20 hours the temperature is raised to 2500° F. A glazing material is now added to the pot 27, which is kept rotating for an hour in order to uniformly coat the interior of the pot with the glaze so that the raw batch materials will not attack the pot walls during the melting period. The batch of glass making material is now introduced into the pot, whereupon the rotation is stopped for say 18 hours, the temperature being maintained at amount 2500° F. At the end of this time the batch of materials will be found to be melted, and the resulting glass free from the bubbles formed during the period of fusion. The pot is then rotated at say 1 revolution per minute, and the temperature dropped to about 2050° F. and after maintaining this temperature and speed of rotation for a period of say 36 hours, the resulting glass will be found to be quite free from striæ.

It is of very great importance to maintain the temperature at the right point while the striæ are being taken out of the glass, and this said point will vary somewhat with the composition and nature of the batch 28. In all cases, said batch 28 must be kept stiff enough to adhere to the sides and bottom of the pot with sufficient tenacity to be lifted up by the rotation of the pot and yet it must be thin, or mobile enough to slide back over itself under the action of gravity, so that the mixing in the body of the mass is effectively accomplished without leaving any striæ undissolved, and without dissolving objectionable quantities of the pot material into the glass layers 35 indicated in dotted line, Fig. 1.

In ordinary cases we have found one rotation per minute for 36 hours and at a temperature of about 2050° F. to be very satisfactory when making high grade optical glass. All through the operation, the greatest care should be taken to keep the pot and batch free from dust and dirt. To this end it is very desirable to wash all air that is admitted to the furnace.

It will now be clear that by following our process we not only get rid of the main causes that give rise to striæ but we also effectually destroy those that exist.

It is obvious that those skilled in the art may vary the details of the apparatus as well as of our process without departing from the spirit of our invention and therefore, we do not wish to be limited to the above disclosure except as may be required by the claims.

What we claim is:—

1. The method of preventing the formation of striæ in molten glass held in a container which consists in bodily agitating said container and its molten contents at a uniform temperature until a complete mixture of the constituents is had, substantially as described.

2. The method of removing striæ from glass which consists in rotatively agitating the pot containing said glass in a molten condition, and maintaining all of said glass at the same temperature substantially as described.

3. The method of mixing the constituents of molten glass in a pot and preventing the formation of striæ which consists in rotatively moving said pot and its contents while in a position inclined to the horizontal and maintaining all of said glass at the same temperature, substantially as described.

4. The method of removing striæ from molten glass held in a pot which consists in holding said glass at a predetermined temperature while subjecting said glass and pot to a rotative movement about an axis, and said glass under the action of gravity to a to and fro movement transverse to said rotative movement, substantially as described.

5. The process of mixing the constituents of molten glass in a pot which consists in bringing said glass to a temperature at which its outer layers will stick to the sides and bottom of said pot, and its inner layers will flow over said outer layers; and rotatively moving said pot and glass to cause said inner layers to mix with each other, substantially as described.

6. The process of mixing the constituents of molten glass in a pot inclined to the horizontal which consists in bringing said glass to a temperature at which its outer layers will stick to the sides and bottom of said pot, and its inner layers will flow over said outer layers; rotatively moving said pot and glass to cause said inner layers to move under the action of gravity transversely of their rotative movement and to mix with each other and holding said glass at a substantially constant temperature during the mixing movement, substantially as described.

7. The method of partially preventing the formation of striæ in optical glass which consists in mixing its molten constituents by a movement of its container instead of by the movements of a stirrer, substantially as described.

8. The method of avoiding the formation of striæ in optical glass due to a dissolving action of the stirrer during the mixing operation which consists in causing the mixing of the constituents of the molten glass solely by a motion of the pot and its contents, substantially as described.

9. In an apparatus for mixing the constituents of molten glass the combination of a pot for holding said glass, and means for moving said pot and its contents around an axis inclined to the horizontal, substantially as described.

10. In an apparatus for mixing the constituents of molten glass and eliminating striæ, the combination of a pot for holding said glass; means for heating said pot and glass; and means for rotating said pot and its contents around an axis inclined to the horizontal, substantially as described.

11. In an apparatus for mixing the constituents of molten glass and eliminating striæ, the combination of a pot for holding said glass; means for heating said pot and glass, and holding it at a substantially constant temperature; and means for rotating said pot and its contents at a desired speed around an axis inclined to the horizontal, substantially as described.

In testimony whereof we affix our signatures.

SAMUEL R. SCHOLES.
LOWELL W. NICOLS.
WALTER F. KAUFMAN.